US010049103B2

(12) United States Patent
Perez et al.

(10) Patent No.: US 10,049,103 B2
(45) Date of Patent: Aug. 14, 2018

(54) AUTHOR PERSONALITY TRAIT RECOGNITION FROM SHORT TEXTS WITH A DEEP COMPOSITIONAL LEARNING APPROACH

(71) Applicant: Xerox Corporation, Norwalk, CT (US)

(72) Inventors: Julien Perez, Grenoble (FR); Scott Nowson, Monkstown (IE); Fei Liu, Point Cook (AU)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/407,713

(22) Filed: Jan. 17, 2017

(65) Prior Publication Data

US 2018/0203848 A1 Jul. 19, 2018

(51) Int. Cl.
*G06F 17/27* (2006.01)
*G10L 25/30* (2013.01)

(52) U.S. Cl.
CPC ........ *G06F 17/2785* (2013.01); *G06F 17/274* (2013.01); *G10L 25/30* (2013.01)

(58) Field of Classification Search
CPC . G06F 17/2881; G06F 17/2785; G10L 15/08; G10L 15/16; G10L 25/03
USPC .......................................................... 704/9
See application file for complete search history.

(56) References Cited

U.S. PATENT DOCUMENTS

| 9,015,093 B1* | 4/2015 | Commons .......... G01C 21/3602 701/23 |
| 2013/0262096 A1* | 10/2013 | Wilhelms-Tricarico G10L 25/90 704/202 |
| 2015/0309962 A1 | 10/2015 | Lichman et al. |
| 2016/0098480 A1 | 4/2016 | Nowson |
| 2016/0140956 A1* | 5/2016 | Yu ........................... G10L 15/08 704/240 |
| 2016/0239573 A1 | 8/2016 | Albert et al. |
| 2016/0307565 A1 | 10/2016 | Liu et al. |
| 2016/0350646 A1* | 12/2016 | Leeman-Munk .... G06N 3/0445 |
| 2016/0350652 A1* | 12/2016 | Min ........................ G06F 17/24 |
| 2016/0352656 A1* | 12/2016 | Galley ................... H04L 51/02 |
| 2017/0185581 A1* | 6/2017 | Bojja .................... G06F 17/276 |
| 2017/0262431 A1* | 9/2017 | Alam ................... G06F 3/04817 |

OTHER PUBLICATIONS

U.S. Appl. No. 15/184,042, filed Jun. 16, 2016, Suri, et al.
Álvarez-Carmona, et al., "INAOE's participation at PAN'15: Author Profiling task—Notebook for PAN at CLEF 2015," Working Notes Papers of the CLEF 2015 Evaluation Labs, pp. 1-9 (2015).
Argamon, et al., "Lexical predictors of personality type," Proc. 2005 Joint Annual Meeting of the Interface and the Classification Society of North America, pp. 1-16 (2005).

(Continued)

*Primary Examiner* — Jakieda Jackson
(74) *Attorney, Agent, or Firm* — Fay Sharpe LLP

(57) ABSTRACT

A method for trait prediction includes receiving a text sequence and generating character embeddings for characters of the text sequence. Word representations for words of the text sequence are generated with a trained character sequence model, based on the character embeddings. A sequence representation is generated for the text sequence with a trained word sequence model, based on the word representations. At least one trait prediction is generated with a trained trait model, based on the sequence representation.

18 Claims, 5 Drawing Sheets

(56) References Cited

OTHER PUBLICATIONS

Bengio, et al., "Learning long-term dependencies with gradient descent is difficult," IEEE Trans. on Neural Networks, vol. 5(2), pp. 157-166 (1994).
Bengio, et al., "A Neural Probabilistic Language Model," Journal of Machine Learning Research 3, pp. 1137-1155 (2003).
Caruana, "Multitask learning," Machine Learning, 28(1):41-75, 1997. Alastair J. Gill, et al., "Taking Care of the Linguistic Features of Extraversion," Proc. CogSci, pp. 363-368 (2002).
Celli, et al., "The workshop on computational personality recognition 2014," Proc. ACM Int'l Conf. on Multimedia, pp. 1245-1246 (2014).
Cho, et al., "On the properties of neural machine translation: Encoder-decoder approaches," arXiv:1409.1259, pp. 1-9 (2014).
Cho, et al., "Learning phrase representations using RNN encoder-decoder for statistical machine translation," Proc. 2014 Conf. on Empirical Methods in Natural Language Processing (EMNLP 2014), pp. 1724-1734 (2014).
Chung, et al., "Empirical evaluation of gated recurrent neural networks on sequence modeling," arXiv:1412.3555, pp. 1-9 (2014).
Collobert, et al., "A unified architecture for natural language processing: Deep neural networks with multitask learning," Proc. 25th Int'l Conf. on Machine Learning (ICML 2008), pp. 160-167 (2008).
Durrani, et al., "Edinburgh's phrase-based machine translation systems for WMT-14," Proc. ACL 2014 9th Workshop on Statistical Machine Translation, pp. 97-104 (2014).
Grant, "Rethinking the extraverted sales ideal: The ambivert advantage," Psychological Science, 24(6), pp. 1024-1030 (2013).
Graves, "Generating sequences with recurrent neural networks," arXiv:1308.0850, pp. 1-43 (2013).
Han, et al., "Lexical normalisation of short text messages: Makn sens a #twitter," Proc. 49th Annual Meeting of the Association for Computational Linguistics: Human Language Technologies, pp. 368-378 (2011).
Hochreiter, et al., "Long short-term memory," Neural computation, vol. 9(8), pp. 1735-1780 (1997).
Hochreiter, et al., "Gradient flow in recurrent nets: the difficulty of learning long-term dependencies," pp. 1-15 (2001).
Huang, et al., "Bidirectional LSTM-CRF models for sequence tagging," arXiv:1508.01991, pp. 1-10 (2015).
Jozefowicz, et al., "An empirical exploration of recurrent network architectures," Proc. 32nd Int'l Conf. on Machine Learning (ICML 2015), pp. 2342-2350 (2015).
Kalchbrenner, et al., "A convolutional neural network for modelling sentences," Proc. ACL, pp. 655-665 (2014).
Kalghatgi, et al., "A neural network approach to personality prediction based on the big-five model," Int'l J. Innovative Research in Advanced Engineering (IJIRAE), vol. 2(8), pp. 56-63 (2015).
Kim, "Convolutional neural networks for sentence classification," Proc. EMNLP, pp. 1746-1751 (2014).
Kingma, et al., "Adam: A method for stochastic optimization," arXiv:1412.6980, pp. 1-15 (2014).
Kumar, et al., "Ask me anything: Dynamic memory networks for natural language processing," arXiv:1506.07285, pp. 1-10 (2015).
Ling, et al., "Finding function in form: Compositional character models for open vocabulary word representation," Proc. 2015 Conf. on Empirical Methods in Natural Language Processing, pp. 1520-1530 (2015).
Liu, et al., "A Language-independent and Compositional Model for Personality Trait Recognition from Short Texts," arXiv:1610.04345v1, pp. 1-11 (Oct. 2016).
Liu, et al, "A Recurrent Compositional Model for Personality Trait Recognition from Short Texts," Proceedings of the Workshop on Computational Modeling of People's Opinions, Personality, and Emotions in Social Media, pp. 20-29 (Dec. 2016).
Manning, "Computational linguistics and deep learning," Computational Linguistics 41(4) pp. 701-707 (2016).
Matthews, et al., "Personality Traits," Chapter 1, pp. 1-2, Cambridge University Press, second edition. Cambridge Books Online. (2003).
Mikolov, et al., "Efficient estimation of word representations in vector space," Int'l Conf. on Learning Representations (ICLR 2013) pp. 1-12 (2013).
Mikolov, et al., "Distributed representations of words and phrases and their compositionality," Proc. 27th Annual Conf. on Neural Information Processing Systems (NIPS 2013), pp. 3111-3119 (2013).
Mirkin, et al., "Motivating personality-aware machine translation," Proc. 2015 Conf. on Empirical Methods in Natural Language Processing, pp. 1102-1108 (2015).
Nowson, et al., "Look! Who's Talking? Projection of Extraversion Across Different Social Contexts," Proc. WCPR14, Workshop on Computational Personality Recognition at ACMM (22nd ACM Int'l Conf. on Multimedia), pp. 1-4 (2014).
Nowson, et al., The Identity of Bloggers: Openness and gender in personal weblogs, AAAI Spring Symposium, Computational Approaches to Analyzing Weblogs, pp. 163-167 (2006).
Nowson, et al., "Weblogs, genres and individual differences," Proc. CogSci, pp. 1666-1671 (2005).
Nowson, et al., "XRCE personal language analytics engine for multilingual author profiling," Working Notes Papers of the CLEF, pp. 1-12 (2015).
Owoputi, et al., "Improved part-of-speech tagging for online conversational text with word clusters," Proc. NAACL, pp. 380-390 (2013).
Pennebaker, et al., "The development and psychometric properties of LIWC2015," LIWC2015 Development Manual, Austin, TX: University of Texas at Austin, pp. 1-25 (2015).
Pennebaker, et al., Psychological aspects of natural language use: Our words, our selves. Annual Review of Psychology, vol. 54, pp. 547-577 (2003).
Pennington, et al., "Glove: Global vectors for word representation," Proc. 2014 Conf. on Empirical Methods in Natural Language Processing (EMNLP 2014), pp. 1532-1543 (2014).
Rammstedt, et al., "Measuring personality in one minute or less: A 10-item short version of the Big Five Inventory in English and German," J. Research in Personality, vol. 41(1), pp. 203-212 (2007).
Rangel, et al., "Overview of the 3rd Author Profiling Task at PAN 2015," Working Notes Papers of the CLEF 2015 Evaluation Labs, CEUR Workshop Proc., pp. 1-40 (2015).
Schwartz, et al., "Personality, Gender, and Age in the Language of Social Media: The Open-Vocabulary Approach," Plos One, vol. 8(9), pp. 1-16 (2013).
Socher, et al., "Recursive deep models for semantic compositionality over a sentiment Treebank," Proc. EMNLP, pp. 1631-1642 (2013).
Su, et al., "Exploiting turn-taking temporal evolution for personality trait perception in dyadic conversations," IEEE/ACM Trans. on Audio, Speech, and Language Processing, vol. 24(4), pp. 733-744 (2016).
Sulea, et al., "Automatic profiling of twitter users based on their tweets," In Working Notes Papers of the CLEF 2015 Evaluation Labs, pp. 1-8 (2015).
Sutskever, et al., "Sequence to sequence learning with neural networks," Advances in neural information processing systems (NIPS 2014), pp. 3104-3112 (2014).
Tannen, "You Just Don't Understand: Women and Men in Conversation," Philosophy and Rhetoric, vol. 26 (1), pp. 61-62 (1993).
Tipping, et al., "Probabilistic principal component analysis," J. Royal Statistical Society: Series B (Statistical Methodology), vol. 61(3), pp. 611-622 (1999).
Tkalčič, et al., "Preface: Empire 2014," Proc. 2nd Workshop Emotions and Personality in Personalized Services (EMPIRE 2014), pp. 1-85 (2014).
Van Der Maaten, et al., "Visualizing data using t-SNE," J. of Machine Learning Res., vol. 9(85) pp. 2579-2605 (2008).
Yang, et al., "Hierarchical attention networks for document classification," Proc. NAACL, pp. 1480-1489 (2016).

\* cited by examiner

AUTHOR PERSONALITY TRAIT RECOGNITION FROM SHORT TEXTS WITH A DEEP COMPOSITIONAL LEARNING APPROACH

BACKGROUND

Aspects of the exemplary embodiment relate to extracting information from text and find particular application in connection with a system and method for recognizing personality traits based on short text sequences.

Exploring the relationship between word use and psychometric traits has provided significant insight into aspects of human behavior (Pennebaker, et al., "Psychological aspects of natural language use: Our words, our selves," Annual Rev. Psychol., 54:547-577, 2003). Different levels of representation of language have been used, such as syntactic, semantic, and higher-order such as the psychologically-derived lexica of the Linguistic Inquiry and Word Count tool (Pennebaker, et al., "The development and psychometric properties of LIWC2015," LIWC2015 Development Manual, Austin, Tex.: University of Texas at Austin, pp. 1-25, 2015, hereinafter, Pennebaker 2015). The study of personality traits based on analysis of text has often used a bag-of-words (BOW) type of approach in which each word in a vocabulary is associated with a respective feature-based word representation. A representation of a sequence of text can then be built by aggregating the word level representations. An example of this method is the Open Vocabulary approach (Schwartz, et al., "Personality, Gender, and Age in the Language of Social Media: The Open-Vocabulary Approach," PLOS ONE, 8(9), pp. 1-16, 2013, hereinafter, Schwartz 2013). Given a set of personality traits, such as Extroversion, Emotional Stability, Agreeableness, Conscientiousness, and Openness, the sequence representation can be used to predict the personality traits of the author of the text.

One drawback of this bag-of-linguistic-features approach is that considerable effort can be spent on feature engineering. Another is that it relies on an assumption that these features, like the traits to which they relate, are similarly stable: the same language features always indicate the same traits. However, the relationship between language and personality is not consistent across all forms of communication (Nowson, et al., "Look! Who's Talking? Projection of Extraversion Across Different Social Contexts," Proc. WCPR14, Workshop on Computational Personality Recognition at ACMM (22nd ACM Int'l Conf. on Multimedia), 2014, hereinafter, Nowson 2014). As an example, the use of negative emotion language (in particular, words relating to 'anger') is a strong indicator of Extraversion in conversational data, but this is not the case in the medium of video blogging.

Classification of short sequences of text, such as tweets and text messages, tends to be particularly challenging, due to the specific uses of language of the user, driven by the message length limitation of the platforms, e.g., 140 characters in Twitter. For example, abbreviated and made-up words tend to be used, which are not in the vocabulary and therefore lack a word representation.

Early work on computational personality recognition used SVM-based approaches and manipulated lexical and grammatical feature sets (Argamon, et al., "Lexical predictors of personality type," Proc. 2005 Joint Annual Meeting of the Interface and the Classification Society of North America, pp. 1-16, 2005; Nowson, et al., "The Identity of Bloggers: Openness and gender in personal weblogs," AAAI Spring Symp., Computational Approaches to Analyzing Weblogs, pp. 163-167, 2006). Data labelled with personality data is sparse (Nowson 2014) and there has been more interest in reporting novel feature sets. For example, surface forms, syntactic features, such as POS tags and dependency relations, analysis of punctuation and emoticon use, use of latent semantic analysis for topic modeling, and the use of external resources such as Linguistic Inquiry and Word Count (LIWC) (Pennebaker 2015) have been investigated. When applied to tweets, however, LIWC requires further cleaning of the data.

Deep-learning based approaches to personality trait recognition have also been investigated. A neural network based approach to personality prediction of users is described in Kalghatgi, et al., "A neural network approach to personality prediction based on the big-five model," Int'l J. Innovative Research in Advanced Engineering (IJIRAE), 2(8):56-63. 2015. In this model, a Multilayer Perceptron (MLP) takes as input a collection of hand-crafted grammatical and social behavioral features from each user and assigns a label to each of the five personality traits. A Recurrent Neural Network (RNN) based system, exploiting the turn-taking of conversation for personality trait prediction, is described in Su, et al., "Exploiting turn-taking temporal evolution for personality trait perception in dyadic conversations," IEEE/ACM Trans. on Audio, Speech, and Language Processing, 24(4):733-744, 2016. In this approach, RNNs are employed to model the temporal evolution of dialog, taking as input LIWC-based and grammatical features. The output of the RNNs is then used for the prediction of personality trait scores of the participants of the conversations. Both of these approaches utilize hand-crafted features which rely heavily on domain expertise. Also they focus on the prediction of trait scores at the user level, given all the available text from a user.

For applying deep learning models to NLP problems, word lookup tables may be used, where each word is represented by a dense real-valued vector in a low-dimensional space (Socher, et al., "Recursive deep models for semantic compositionality over a sentiment Treebank," Proc. EMNLP, pp. 1631-1642, 2013; Kalchbrenner, et al., "A convolutional neural network for modelling sentences," Proc. ACL, pp. 655-665, 2014; Yoon Kim, "Convolutional neural networks for sentence classification," Proc. EMNLP, pp. 1746-1751, 2014). In order to obtain a sensible set of embeddings, a large corpus may be used for training the mode; in an unsupervised fashion, e.g., using Word2Vec representations (Mikolov, et al., "Efficient estimation of word representations in vector space," Int'l Conf. on Learning Representations (ICLR 2013), 2013; Mikolov, et al., "Distributed representations of words and phrases and their compositionality," Proc. 27th Annual Conf. on Neural Information Processing Systems (NIPS 2013), pp 3111-3119, 2013) and GloVe (Pennington, et al., Glove: Global vectors for word representation," Proc. 2014 Conf. on Empirical Methods in Natural Language Processing (EMNLP 2014), pp. 1532-1543, 2014).

Despite the success in capturing syntactic and semantic information with such word vectors, there are two practical problems with such an approach (Ling, et al., "Finding function in form: Compositional character models for open vocabulary word representation," Proc. 2015 Conf. on Empirical Methods in Natural Language Processing, pp. 1520-1530, 2015, hereinafter, Ling 2015). First, due to the flexibility of language, previously unseen words are bound to occur regardless of how large the unsupervised training corpus is. The problem is particularly serious for text extracted from social media platforms, such as Twitter and Facebook, due to the noisy nature of user-generated text, e.g., typos, ad hoc acronyms and abbreviations, phonetic substitutions, and even meaningless strings (Han, et al., "Lexical normalisation of short text messages: Makn sens a #twitter," Proc. 49th Annual Meeting of the ACL: Human Language Technologies, pp. 368-378, 2011). Second, the number of parameters for a model to learn is overwhelmingly large. Assuming that each word is represented by a vector of d dimensions, the total size of the word lookup table is d×|V|, where |V| is the size of the vocabulary, which tends to scale to the order of hundreds and thousands. Again, this problem is even more pronounced in noisier domains, such as short text generated by online users.

A compositional character-to-sequence model is described herein which addresses some of these problems.

INCORPORATION BY REFERENCE

The following references, the disclosures of which are incorporated by reference in their entireties, are mentioned:

U.S. Pub. No. 20150309962, published Oct. 29, 2015, entitled METHOD AND APPARATUS FOR MODELING A POPULATION TO PREDICT INDIVIDUAL BEHAVIOR USING LOCATION DATA FROM SOCIAL NETWORK MESSAGES, by Lichman, et al.

U.S. Pub. No. 20160098480, published Apr. 7, 2016, entitled AUTHOR MODERATED SENTIMENT CLASSIFICATION METHOD AND SYSTEM, by Nowson.

U.S. Pub. No. 20160239573, published Aug. 18, 2016, entitled METHODS AND SYSTEMS FOR PREDICTING PSYCHOLOGICAL TYPES, by Albert, et al.

U.S. Pub. No. 20160307565, published Oct. 20, 2016, entitled DEEP NEURAL SUPPORT VECTOR MACHINES, by Liu, et al.

U.S. application Ser. No. 15/184,042, filed Jun. 16, 2016, entitled PROFILING OF USERS BEHAVIOR AND COMMUNICATION IN BUSINESS PROCESSES, by Suri, et al.

BRIEF DESCRIPTION

In accordance with one aspect of the exemplary embodiment, a method for trait prediction includes receiving a text sequence and generating character. embeddings for characters of the text sequence. Word representations for words of the text sequence are generated with a trained character sequence model, based on the character embeddings. A sequence representation is generated for the text sequence with a trained word sequence model, based on the word representations. At least one trait prediction is generated with a trained trait model, based on the sequence representation.

At least one of the generating character embeddings, generating word representations, generating the sequence representation, and generating at least one trait prediction may be performed with a processor.

In accordance with another aspect of the exemplary embodiment, a system for trait prediction includes a hierarchical prediction model which includes a character sequence model, which generates word representations for words of the text sequence, based on respective character embeddings, a word sequence model, which generates a sequence representation for the text sequence, based on the word representations, and a trait model, which generates at least one trait prediction, based on the sequence representation. A character embedding component generates character embeddings for characters of an input text sequence. A modeling component inputs the character embeddings for each word into the hierarchical prediction model. A processor implements the character embedding component and modeling component.

In accordance with another aspect of the exemplary embodiment, a method for representing a text sequence includes receiving a text sequence including a sequence of words, each of the words comprising a sequence of at least one character, at least some of the words comprising more than one character. With a character embedding component, character embeddings are generated for characters of the input text sequence. The character embeddings are input to a hierarchical prediction model which includes a character sequence model, which generates word representations for words of the text sequence, based on respective character embeddings, and a word sequence model, which generates a sequence representation for the text sequence, based on the word representations. Information regarding an author of the text sequence is output, based on the sequence representation.

At least one of the generating character embeddings and inputting the character embeddings into a hierarchical prediction model may be performed with a processor.

DETAILED DESCRIPTION

Aspects of the exemplary embodiment relate to a system and method for predicting personality traits with a deep-learning model for personality recognition. The prediction involves a supervised sequence classification, which is based on a joint atomic representation of the text, based on both characters and words. The system is flexible enough to be able to predict trait scores from a single short text, such as a tweet. The system can also be used to infer the personality of a user, given a collection of short texts.

An automatic latent representation inference based on a parse-free input representation of the text can balance the bias and variance of a typically sparse dataset.

As used herein, a "character" is a single symbol in a predefined, finite alphabet of characters (e.g., a subset of the ASCII character set). No character in the alphabet includes more than one symbol. A "word" includes a set of characters drawn from the alphabet, and although some words may consist of a single character, at least some of the words in a text sequence include at least two, or at least three, or at least four of the characters. As defined herein, "words" can include number sequences, punctuation, and the like, and need not be defined in a dictionary, such as words made up by an author. A "text sequence" is a sequence of words and while some text sequences may consist of a single word, at least some text sequences include at least two, or at least three, or at least four words.

Figure 1:
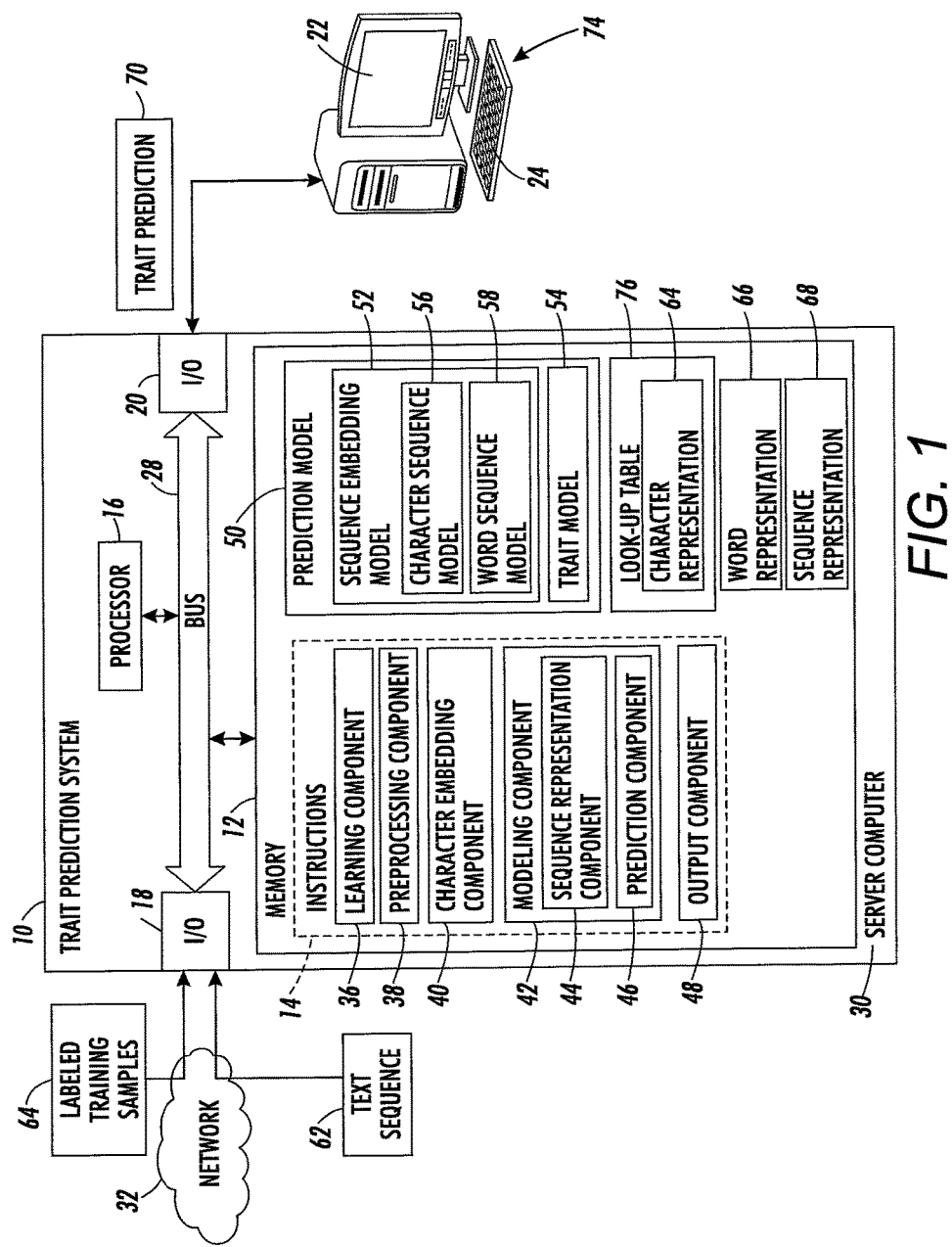
FIG. 1 is a functional block diagram of a system for trait prediction in accordance with one aspect of the exemplary embodiment.

With reference to FIG. 1, a functional block diagram of a computer-implemented system 10 for personality trait prediction is shown. The illustrated computer system 10 includes memory 12 which stores software instructions 14 for performing the method illustrated in FIG. 2 and a processor 16 in communication with the memory for executing the instructions. The system 10 also includes one or more input/output (I/O) devices, such as a network interface 18 and/or a user input output interface 20. The I/O interface 20 may communicate with one or more of a display 22, for displaying information to users, speakers, and a user input device 24, such as a keyboard or touch or writable screen, and/or a cursor control device, such as mouse, trackball, or the like, for inputting text and for communicating user input information and command selections to the processor device 16. The various hardware components 12, 16, 18, 20 of the system 10 may all be connected by a data/control bus 28.

The computer system 10 may include one or more computing devices 30, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores instructions for performing the exemplary method as well as the processed data.

The network interface 18 allows the computer to communicate with other devices via a computer network 32, such as a local area network (LAN) or wide area network (WAN), telephone network, or the internet, and may comprise a modulator/demodulator (MODEM) a router, a cable, and/or Ethernet port.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 30.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The illustrated software instructions 14 include a learning component 36, a text preprocessing component 38, a character embedding component 40, a modeling component 42 including a sequence representation component 44, a prediction component 46, and an output component 48.

The learning component 36 learns a prediction model or models 50. Model 50 is a compositional model including a sequence embedding model 52 and a trait prediction model 54. The sequence embedding model 52 includes a character sequence model 56 and a word sequence model 58. The learning component 36 has access to a training collection 60 of text sequences that are each labeled with a personality trait label. Each personality trait label may include a value for each, or at least one, of a predefined set of personality traits. The exemplary set of personality traits, sometimes referred to as the Big 5, includes the traits Extroversion (EXT), Emotional Stability (STA), Agreeableness (AGR), Conscientiousness (CON), and Openness (OPN). Low values for the traits indicate their inverse or lack of these traits, i.e., introversion, neuroticism, disagreeableness, carelessness, and reticence, respectively. However, fewer, more, or different personality traits may be in the set, which may be specific to the end use of the prediction. In one embodiment, a separate model is learned for each personality trait. In another embodiment, a multitask model is learned which outputs predictions for two or more traits. Once the prediction model(s) 50 has/have been learned, the learning component 36 may be omitted. Alternatively, model learning may be performed on a separate computing device.

The optional text preprocessing component 38 receives and decomposes an input text sequence 62 into a sequence of words composed of characters drawn from an alphabet, i.e., a predefined, finite set of characters. Characters which are not in the alphabet may be ignored, assigned to an "unknown" character, or converted to the closest character, e.g., accented characters may be converted to the corresponding un-accented ones.

The character embedding component 40 generates a character-level representation 64 (multi-dimensional vector) for each character in each word of the text sequence 62 (or in a set of text sequences) associated with an author.

The sequence representation component 44 of the modeling component inputs the set of character-level representations 64 for each word of the text sequence 62 into the learned model 50. First, the character sequence model 56 generates a word representation 66 (multi-dimensional vector) for each of the words in the text sequence, based on the respective character-level representations 64. The set of word representations 66 are then input to the word sequence model 58, which outputs a sequence representation 68 based thereon, i.e., a multidimensional representation of the input sequence 62 of words. The prediction component 46 inputs the sequence representation 68 into the learned trait model 54, which outputs a trait prediction 70 based thereon. The output 70 of the model 50 may be a prediction with respect to at least one personality trait for the author of the text sequence 62. As will be appreciated, trait predictions for a group of sequences from the same author (or even a set of authors) may be aggregated into an overall prediction. Additionally, while the sequence representation component 44 and prediction component 46 are shown as separate components they may operate as a single modeling component 42.

The output component 48 outputs the trait prediction 70, or information based thereon, to an output device 74, e.g., to a client computing device, display device 22, printer, external memory device, or the like. In some embodiments, the output component 48 generates information based on the trait prediction 70, such as whether the author is predicted to be a good candidate for a certain role, e.g., in employee hiring or job seeking, what the author's views on a certain topic are predicted to be, a recommendation for the author, such as groups to join or products/services that the author may be interested in, or the like.

Figure 2:
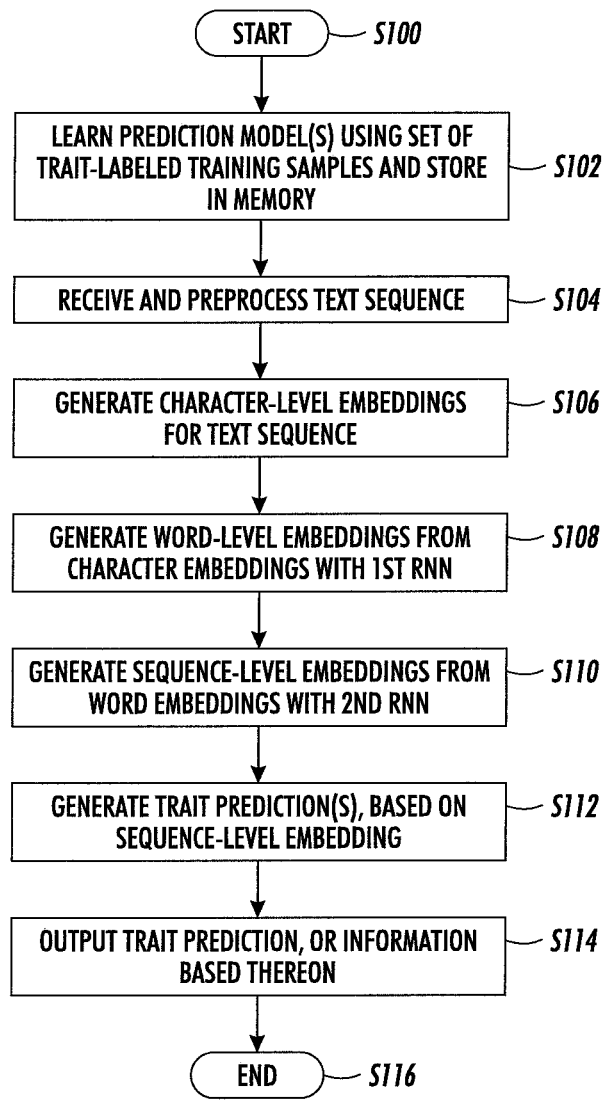
FIG. 2 is a flow diagram illustrating a method for trait prediction in accordance with another aspect of the exemplary embodiment.

FIG. 2 illustrates a method for trait prediction which can be performed with the system of FIG. 1. The method begins at S100.

Figure 3:
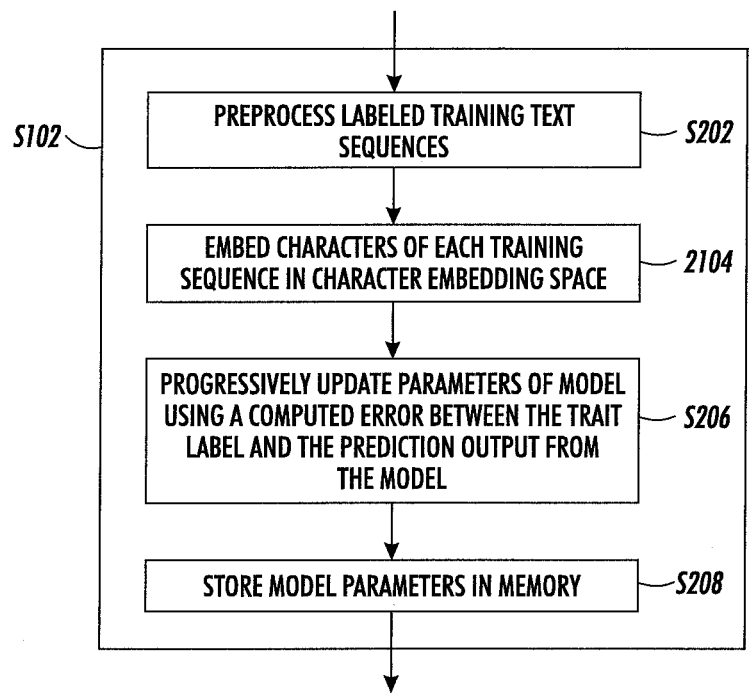
FIG. 3 is a flow diagram illustrating learning a prediction model in the method of FIG. 2.

At S102, one or more prediction model(s) 50 is learned using the set of trait-labeled training samples 60, by the learning component 36, and stored in memory 12. With reference also to FIG. 3, model learning may include preprocessing the training text sequences 60 (S202), embedding characters of each training sequence in an embedding space (in the same manner as for an input sequence 62) (S204), passing the embedded character representations through the model 50, and using a computed error between the trait label and the prediction output from the model to progressively adapt the parameters of the model 50 (S204). The learned parameters of the model 50 may be stored in computer memory, such as memory 12. As will be appreciated, given a learned model 50, step S102 can be omitted.

At S104, an input text sequence 62 is received, and may undergo preprocessing, by the preprocessing component 38 (as for S202).

At S106, a character-level embedding 64 is generated for each character in the optionally preprocessed text sequence, by the character embedding component 40 (as for S204).

At S108, the set of character-level embeddings of each word are input to the character sequence model 56 of the model 50, by the sequence representation component 44. A word-level representation 66 is generated and output for each word in the optionally preprocessed text sequence, by the model 56.

At S110, the set of word-level embeddings output at S108 are input to the word sequence model 58, by the sequence representation component 44. A sequence-level representation 68 is generated and output for the input text sequence, by the model 58.

At S112, the sequence-level representation 68 is input to the trait model 54, by the prediction component 46. A prediction 70, such as a score, for at least one trait is output by the prediction model.

At S114, the trait prediction 70, or information based thereon, is output from the system 10 by the output component 48.

The method ends at S116.

The method illustrated in FIGS. 2 and/or 3 may be implemented in a computer program product (or products) that may be executed on a computer (or computers). The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 30, (for example, an internal hard drive of RAM), or may be separate (for example, an external hard drive operatively connected with the computer 30), or may be separate and accessed via a digital data network such as a local area network (LAN) or the Internet (for example, as a redundant array of inexpensive or independent disks (RAID) or other network server storage that is indirectly accessed by the computer 30, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIGS. 2 and/or 3, can be used to implement the method for trait prediction. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details of the system and method will now be described.

Sequence Preprocessing (S104, S202)

The input text sequence 62 may be a short message, such as a sentence or a sorter or longer sequence, e.g., one which is limited to a maximum number of characters, such as a tweet. In some embodiments, longer sequences may be split into two or more shorter ones, such as sentences, which may be processed separately. While sequences 62 of as few as one word may be considered, in general, an input text sequence 62 includes two or more words, and in general, at least three words.

The input sequence may undergo some limited preprocessing. In particular, the sequence may be tokenized to identify a sequence of words. An input sequence, for example, could be "Saw u by the elev8r @JohnSmith," with the words (saw, u, by, etc.) being identified by the white spaces between them. As will be appreciated, the words are not n-grams in that they are not limited to any fixed size n. Tokenization, in the case of tweets, may be performed using Twokenizer (see, Owoputi, et al., "Improved part-of-speech tagging for online conversational text with word clusters," Proc. NAACL, pp. 380-390, 2013), in order to normalize hashtag-preceded topics, user mentions, and/or uniform resource locators (URLs). Unlike the majority of the language used in a tweet, URLs and mentions are used for their targets, and not their surface forms. The text can be normalized by mapping these features to single characters (e.g., @username→@; http://t.co/→^; and #topic→#). Thus, the sequence above may be processed to generate the word sequence "Saw u by the elev8r @". This limits the risk of modeling the character usage (e.g., in JohnSmith) which was not directly influenced by the personality of the author.

Each word $w_i$ is decomposed into a sequence of characters $\{c_1, c_2, \ldots, c_j, \ldots, c_n\}$, drawn from a predefined alphabet C of characters, where n is the number of characters in the word. The number of characters in the alphabet is represented by $|C|$. In practice, some or most of the words include two or more characters, although some may have only one. The exemplary alphabet may include an entry for each uppercase and lowercase letter as well as numbers and punctuation and those used to represent generic placeholders, such as @, ^, and #. In some languages, accented characters may also be included in the alphabet. Unrecognized characters may all be assigned to a common representative character, such as *, or ignored.

Character Embedding (S106)

The character embedding component 40 outputs a character embedding 64 for each character in the input, optionally preprocessed, text sequence 62. Specifically, suppose the text sequence 62 is a sentence s consisting of a sequence of words $\{w_1, w_2, \ldots, w_i, \ldots, w_m\}$, where m is the number of words in the text sequence 62. A function $c(w_i,j)$ is defined which takes as input a word $w_i$, together with an index j and returns the one-hot vector representation of the $j^{th}$ character of the word $w_i$. This is a binary vector of length $|C|$ (the size of the character alphabet), having a 1 at the index $c_j$ of the character and where all other entries are 0. An embedding $c_{i,j}$ of the character, $c(w_i,j)$ is generated with a transformation $E_c$ that converts the one hot vector to a d-dimensional vector: $c_{i,j}=E_c c(w_i,j)$, where $E_c \in \mathbb{R}^{d \times |C|}$ ($E_c$ is a learnt parameter matrix of the model 50). This multiplies the one hot vector by a $d \times |C|$ matrix $E_c$ to generate a vector of dimensionality d. d may be for example, at least 10 or at least 20 and in some embodiments may be up to 1000 or up to 100, such as 50. In the next stage, in order to construct the representation of word $w_i$, the sequence of character embeddings $\{c_{i,1}, \ldots, c_{i,n}\}$, is taken as input to the model 50.

In one embodiment, a look up table 76, or other data structure may be generated, which stores the character embeddings 64 for characters in the alphabet. The look up table 76 may be stored in memory 12, avoiding the need to compute the character embeddings on the fly.

Sequence Representation and Prediction

Figure 4:
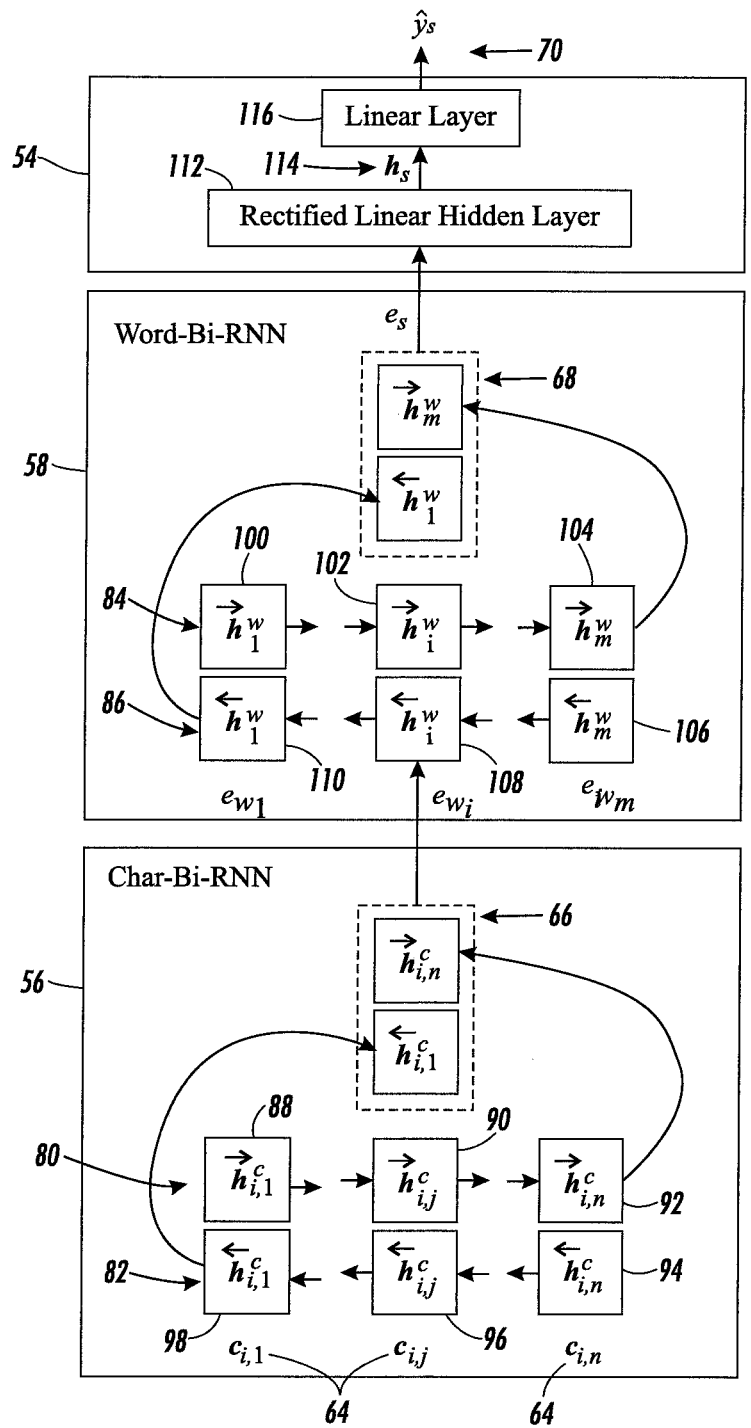
FIG. 4 illustrates an exemplary prediction model.

An exemplary prediction model 50 is illustrated in FIG. 4, where dotted boxes indicate concatenation. The compositional model 50 operates hierarchically at the character, word and sentence level, while being capable of harnessing personality-sensitive signals buried as deep as the character level. During training, the model 50 learns the embeddings of characters and how they can be used to construct words. The exemplary model includes a hierarchy of recurrent neural networks (RNN) 56, 58, 54, stacked one on top of the other.

In the exemplary model 50, the representation 66 of each word is constructed, at S108 (and similarly, during the training phase), by the character sequence model 56, from its constituent character embeddings 64. The illustrated character sequence model 56 is a first neural network, such as character-level bi-directional recurrent neural network (Char-Bi-RNN). While a single Char-Bi-RNN 56 is illustrated in FIG. 4, each word in the sequence is separately passed through the Char-Bi-RNN. The constructed word representations 66 are then fed, at S110, to the word sequence model 58, which can be a second neural network, such as a word-level bi-directional RNN (Word-Bi-RNN).

Each RNN model 56, 58 is composed of a number of recurrent units (or cells), each having parameters that are iteratively adapted, in training, by applying a sequence of updates. In the case of the RNN model 56, forward and backward character RNNs 80, 82, each composed of a sequence of the recurrent units 88, 90, 92 and 94, 96, 98, generate a respective output hidden state as a function of a respective character embedding and a hidden state generated for previously seen characters. The number of hidden states generated corresponds to the number of characters in the word being considered. Each word is represented by the concatenation of the last hidden states of the forward and backward character-RNNs 80, 82 respectively. In the case of the RNN model 58, forward and backward word RNNs 84, 86, each composed of a sequence of the recurrent units 100, 102, 104 and 106, 108, 110, generate a respective output hidden state as a function of a respective word embedding and a hidden state generated for previously-seen words. The number of hidden states generated corresponds to the number of words in the sequence being considered. The sentence 62 is represented by the concatenation 68 of the last hidden states of the forward and backward Word-RNNs 84, 86 respectively.

Each hidden state may be a vector of at least 20 dimensions, such as at least 64, or at least 128, or at least 256 dimensions. Hidden states of the RNNs 56, 58 may have the same number, or a different number, of dimensions.

Subsequently, at S112, the prediction model 54, such as a feedforward neural network, takes as input the representation 68 of a sentence output by the RNN model 58 and returns a prediction 70, e.g., as scalar score, for a specific personality trait (or in a multitask model, for more than one trait, such as for at least two, or at least three, or up to twenty, or up to ten traits, such as five traits). The entire model 50 is referred to in the examples below as a Character to Word to Sentence for Personality Trait (C2W2S4PT) model.

The character sequence model (e.g., Char-Bi-RNN) 56 can be constructed similarly to the character-level word representation learning (C2 W) model of Ling 2015. This model is based on the assumption that character sequences are syntactically and semantically informative of the words they compose. In one embodiment, the model 56 includes a bi-directional long short-term memory (LSTM) network, as described, for example, in Hochreiter, et al., "Long short-term memory," Neural computation, 9(8):1735-1780, 1997. In another embodiment, a gated recurrent unit (GRU) network is used, as described for example in Chung, et al., "Empirical evaluation of gated recurrent neural networks on sequence modeling," arXiv:1412.3555, 2014; Kumar, et al., "Ask me anything: Dynamic memory networks for natural language processing," arXiv:1506.07285, 2015; and Jozefowicz, et al., "An empirical exploration of recurrent network architectures," Proc. 32nd Int'l Conf. on Machine Learning (ICML 2015), pp. 2342-2350, 2015.

The model 58 may be configured similarly to that of the character level model 56, e.g., as an LSTM or GRU network, but in this case, takes as input the word-level representations 66, with the output 68 being at the sentence level. Both layers may include forward and backward RNNs 80, 82 and 84, 86, respectively.

In order to construct the representation of word $w_i$, the sequence of character embeddings 64 $\{c_{i,1}, \ldots, c_{i,n}\}$, where n is the number of characters in $w_i$, is taken as input to the Char-Bi-RNN 56. As an example, in the case of a gated recurrent unit (GRU) as the recurrent unit in the Bi-RNNs, the forward pass 80 of the Char-Bi-RNN is carried out using the following updates for each GRU unit 88, 90, 92:

$$\vec{z}_{i,j}{}^c = \sigma(\vec{W}_z{}^c c_{i,j} + \vec{U}_{hz}{}^c \vec{h}_{i,j-1}{}^c + \vec{b}_z{}^c) \tag{1}$$

$$\vec{r}_{i,j}{}^c = \sigma(\vec{W}_r{}^c c_{i,j} + \vec{U}_{hr}{}^c \vec{h}_{i,j-1}{}^c + \vec{b}_r{}^c) \tag{2}$$

$$\vec{\tilde{h}}_{i,j}{}^c = \tan h(\vec{W}_h{}^c c_{i,j} + \vec{r}_{i,j}{}^c \odot \vec{U}_{hh}{}^c \vec{h}_{i,j-1}{}^c + b_h{}^c) \tag{3}$$

$$\vec{h}_{i,j}{}^c = \vec{z}_{i,j}{}^c \odot \vec{h}_{i,j-1}{}^c + (1-\vec{z}_{i,j}{}^c) \odot \vec{\tilde{h}}_{i,j}{}^c \tag{4}$$

where σ represents point-wise nonlinearities such as a sigmoid or hyperbolic tangent function (e.g., a sigmoid function), ⊙ is the element-wise product, tank is the hyperbolic tangent, $\vec{W}_z^c$, $\vec{W}_r^c$, $\vec{W}_h^c$, $\vec{U}_{hz}^c$, $\vec{U}_{hr}^c$, $\vec{U}_{hh}^c$ are the parameters for the model to learn (weight matrices), and $\vec{b}_z^c$, $\vec{b}_r^c$, $\vec{b}_h^c$ are the bias terms (weight vectors). $\vec{h}_{i,j-1}^c$ is the input hidden state, $\vec{h}_{i,j}^c$ is the output hidden state, and $\vec{\tilde{h}}_{i,j}^c$ is an intermediate hidden state. The bias terms may be vectors having the same number of dimensions as the hidden states, and may be selected by cross validation or learned during training. The weight matrices have the same number of dimensions as the hidden states and bias terms in one direction and twice that number in the other direction, e.g., a 512×256 element matrix.

Each GRU (or LSTM) cell 88, 90, 92 of the forward pass 80 takes as input the representation of the next character in the word being represented, going from left to right (i.e., in the reading direction). Eqns. (1)-(4) are then computed. Except for the first cell, Eqns. (1) and (2) take as input the hidden state representation $\vec{h}_{i,j-1}^c$ generated as the output of Eqn. (4) in the previous cell, in addition to the character embedding $c_{i,j}$ 64. For the first cell 88, corresponding to the first letter in the word, a predefined $\vec{h}_{i,j-1}^c$ is used, since there is no prior cell. Thus for example, if the word to be represented is cat, the first cell 88 takes as input the embedding of the first character c as $c_{i,j}$ and Eqn. (4) outputs a hidden state $\vec{h}_{i,j}^c$ for that letter. This is input to Eqns. (1) and (2) in the second cell 90 as $\vec{h}_{i,j-1}^c$ and the embedding of the letter a is input as $c_{i,j}$. The embedding of the last letter t of the word is input to the final cell 92, whose output $\vec{h}_{i,j}^c$ is used to generate the word embedding 66.

The backward pass 82, the hidden state of which is symbolized by $\overleftarrow{h}_{i,j}^c$, is performed similarly, although with a different set of GRU weight matrices $\overleftarrow{W}_z^c, \overleftarrow{W}_r^c, \overleftarrow{W}_h^c$, $\overleftarrow{U}_{hz}^c, \overleftarrow{U}_{hr}^c, \overleftarrow{U}_{hh}^c$ bias terms $\overleftarrow{b}_z^c, \overleftarrow{b}_r^c, \overleftarrow{b}_h^c$. It should be noted that both the forward and backward passes of the Char-RNN 56 share the same character embeddings. Thus, for example, in the case of the word cat, the first cell 94 of the backward pass takes as input the embedding $c_{i,j}$ of the character t and a predefined $\overleftarrow{h}_{i,j-1}^c$. Eqn. (4) outputs $\overleftarrow{h}_{i,j}^c$, which is input, to the next cell 96 in the sequence, as $\overleftarrow{h}_{i,j-1}^c$ along with the embedding $c_{i,j}$ of the letter a, and so forth, with the hidden state $\overleftarrow{h}_{i,j}^c$, of the final cell 98, being used to generate the word embedding 66.

As illustrated in FIG. 4, $w_i$ is represented by the concatenation of the last hidden states $\vec{h}_{i,n}^c$ and $\overleftarrow{h}_{i,j}^c$ of the forward and backward Char-RNNs 80, 82. Specifically, the word representation $e_{w_i} = [\vec{h}_{i,n}^c; \overleftarrow{h}_{i,1}^c]^T$, where T represents the transpose operator.

In some embodiments, word embeddings 66 for some commonly-used words may be precomputed with the model 56 and stored in a data structure, such as a look-up table, in memory 12 so that they do not need to be recomputed for each new text sequence 62.

Once all the word representations $e_{w_i}$ for $i \in [1,n]$ (the words in the input sequence) have been constructed from their constituent characters, they are then processed by the Word-Bi-RNN 58, which is similar to the Char-Bi-RNN but on the word level with word rather than character embeddings:

$$\vec{z}_i^w = \sigma(\vec{W}_z^w e_{w_i} + \vec{U}_{hz}^w \vec{h}_{i-1}^w + \vec{b}_z^w) \quad (5)$$

$$\vec{r}_i^w = \sigma(\vec{W}_r^w e_{w_i} + \vec{U}_{hr}^w \vec{h}_{i-1}^w + \vec{b}_r^w) \quad (6)$$

$$\vec{\tilde{h}}_i^w = \tanh(\vec{W}_h^w e_{w_i} + \vec{r}_i^w \odot \vec{U}_{hh}^w \vec{h}_{i-1}^w + \vec{b}_h^w) \quad (7)$$

$$\vec{h}_i^w = \vec{z}_i^w \odot \vec{h}_{i-1}^w + (1 - \vec{z}_i^w) \odot \vec{\tilde{h}}_i^w \quad (8)$$

for the forward pass 84, where $\vec{W}_z^w$, $\vec{W}_r^w$, $\vec{W}_h^w$, $\vec{U}_{hz}^w$, $\vec{U}_{hr}^w$, $\vec{U}_{hh}^w$ are the parameters (matrices) for the model to learn, and $\vec{b}_z^w$, $\vec{b}_r^w$, $\vec{b}_h^w$ are the bias terms (vectors). In a similar fashion to how a word is represented, the sentence embedding is constructed by concatenation: $e_s = [\vec{h}_m^w; \overleftarrow{h}_1^w]^T$. Here, the input to Eqn. (5) of the first cell 100 in the forward pass is the word embedding $e_{w_1}$ of the first word in the sequence. For example, for the sequence "the cat sat", the word embedding of the, output by the Character-Bi-RNN 56, is input to Eqn. (5), together with a predefined $\vec{h}_{i-1}^w$, and so forth, in a similar manner as for the character RNN 56. The backward pass is performed using the same equations for each cell in the reverse word order ("sat cat the"), with the respective set of backward parameter matrice and bias terms.

In the case of an LSTM, rather than a GRU, specific gates are used:

$$\vec{i}_t = \sigma(\vec{W}_{xi} x_t + \vec{W}_{hi} \vec{h}_{t-1} + \vec{W}_{ci} \vec{c}_{t-1} + \vec{b}_i) \quad (9)$$

$$\vec{f}_t = \sigma(\vec{W}_{xf} x_t + \vec{W}_{hf} \vec{h}_{t-1} + \vec{W}_{cf} \vec{c}_{t-1} + \vec{b}_f) \quad (10)$$

$$\vec{c}_t = f_t \vec{c}_{t-1} + i_t \tanh(\vec{W}_{xc} x_t + \vec{W}_{hc} \vec{h}_{t-1} + \vec{b}_c) \quad (11)$$

$$\vec{o}_t = \sigma(\vec{W}_{xo} x_t + \vec{W}_{ho} \vec{h}_{t-1} + \vec{W}_{co} \vec{c}_t + \vec{b}_o) \quad (12)$$

$$\vec{h}_t = \vec{o}_t \tanh \vec{c}_t \quad (13)$$

where $\vec{i}_t$, $\vec{o}_t$, and $\vec{f}_t$ are the respective input, output, and forget gates, $\vec{o}_t$ and tan h are the element-wise sigmoid and hyperbolic tangent activation functions, x the input and b the bias term. Backward LSTMs are similarly constructed.

In the exemplary embodiment, to estimate the score for a particular personality trait, the Word-Bi-RNN 58 is topped with a Multi-Layer Perceptron (MLP) 54 which takes as input the sentence embedding $e_s$ output by the word Word-Bi-RNN 58 and returns the estimated score $\hat{y}_s$ for a given trait. In a first layer 112 of the model 54, the sentence embedding $e_s$ 68 is passed through a REctified Linear Unit (ReLU). This applies an activation function of the form $h_s = \text{ReLU}(W_{eh} e_s + b_h)$, where ReLU is the REctified Linear Unit defined as $\text{ReLU}(x) = \max(0,x)$, that assigns a value of 0 to negative values in the output vector $h_s$, $W_{eh}$ is the parameter for the model to learn, $b_h$ is the bias term, and $h_s$ the hidden representation 114 of the MLP. This is passed to a second, linear layer 116, which returns an estimated score $\hat{y}_s = W_{hy} h_s + b_y$, where $W_{hy}$ is the parameter for the model to learn (e.g., a vector), $b_y$ is the bias term (e.g., a scalar value), and $\hat{y}_s$ may be a scalar value between 0 and 1. In this embodiment, a model 50 is learned for each character trait, i.e., 5 models 50 in the illustrative embodiment. In another embodiment, described below, multitask learning is used and the output $\hat{y}_s$ may be vector of scalar values, one value for each trait.

Generating User Scores

Rather than outputting trait score(s) at the tweet level, at S112, the system may additionally or alternatively output personality trait scores at the user (author) level. In this case, the system takes as input a group of text sequences, e.g., tweets, attributed to the same author.

In one embodiment, the personality trait scores for each text sequence are computed independently and then aggregated, e.g., averaged. In another embodiment, a single document per user is generated by concatenating the text sequences to form a single text sequence. In another embodiment, an additional document level layer (not shown) may be incorporated in the model 50, between the layers 58 and 54, which takes as input the group of sequence representations $\{e_{s_1}, \ldots, e_{s_g}\}$, where g is the number of sequences, and outputs $e_g$, a vectorial representation of the group of sequences. The group layer may be an RNN, an aggregating function, or the like.

Learning the Prediction Model (S102)

As illustrated in FIG. 3, the parameters of the model 50 can be learned using the set of training samples and respective personality trait labels drawn from the predefined set of personality traits. In one embodiment, each training sample has a label which is a vector of scores, one score for each personality trait. These may each be a scalar value, e.g., from 0-1, with 1 representing a high level of the particular trait and 0 a low level (absence) of the trait, or in some other range, such as −0.5 to +0.5. The trait scores may be assigned by the author him or herself, or by someone familiar with the author. The trait scores for the author may be normalized so that they sum to a predetermined value, such as 1. All training samples from the same author are then given the same label.

Learning (S206) may be performed by stochastic gradient descent, or other iterative process. In the exemplary training method, character representations 64 of the optionally preprocessed training sequences are generated by the embedding component 40 (S204) and fed into the model 50 by the learning component. The model 50 is initialized with a set of parameter values which are iteratively refined to minimize the error between the trait prediction $\hat{y}_s$ output by the model 50 and the "true" trait label assigned to the training sample. Training may be performed in batches, with the parameters being updated after each batch.

In one embodiment, the method described in Diederik Kingma, et al., "Adam: A method for stochastic optimization," arXiv:1412.6980, 2014, is used for training the model. This approach has an advantage in that it only requires first-order gradients with little memory requirement. The method computes individual adaptive learning rates for different parameters from estimates of first and second moments of the gradients.

All the components 54, 56, 58 in the model may be jointly trained using, for example, the mean square error as the objective function to be minimized over the training set:

$$L(\theta) = \frac{1}{n}\sum_{i=1}^{n}(y_{s_i} - \hat{y}_{s_i})^2,$$

where $y_{s_i}$ is the ground truth personality score of sentence $s_i$ and $\theta$ is the collection of all embedding (i.e., $E_c$) and weight matrices and bias terms for the model 50 to learn.

The learning of the model 50 uses the same type of character embeddings as are used in the prediction stage, e.g., vectors of 50 dimensions.

The word representations used throughout the method may be of the same size or of larger size than the character embeddings, for example, at least twice or at least four times the number of dimensions, such as 256 dimensions. The sequence representations used throughout the method may be of the same size or of larger size than the word representations, e.g., twice the size, such as 512 dimensions.

Multitask Learning

While the dimensions of personality in any single model are designed to be independent of one another, some correlations between traits are to be expected. To take advantage of such correlations, a model may be trained which is capable of simultaneously predicting multiple highly correlated personality traits.

A multitask learning model similar to the model 50 described above can be generated, which shares the Char-Bi-RNN and Word-Bi-RNN components 56, 58 described above, but has personality-trait-specific final layers, to predict multiple correlated personality traits simultaneously. For example, a collection of personality-trait-specific final layers is employed which compute a respective representation $h_{p,s}=\text{ReLU}(W_{peh}e_s+b_{ph})$, and then the estimated score for each trait $\hat{y}_{p,s}=W_{phy}h_{p,s}+b_{py}$, where p represents one of the set of traits, e.g., p∈{EXT,STA,AGR,CON,OPN}, and $W_{peh}$, $W_{phy}$, $b_{ph}$, and $b_{py}$ are the trait-specific weight matrices and bias terms. The respective loss functions can then be:

$$L_p(\theta_p) = \frac{1}{n}\sum_{i=1}^{n}(y_{p,s_i} - \hat{y}_{p,s_i})^2,$$

where $L_p(\theta_p)$ is the loss function for a specific personality trait p. Note that, apart from the Bi-RNN embedding and weight matrices and bias terms, $\theta_p$ now also includes the trait-specific weight matrices $W_{peh}$, $W_{phy}$ and bias terms $b_{ph}$, $b_{py}$. The model is then jointly trained using the sum of the loss functions: $L(\theta)=\Sigma_{p\in P} L_p(\theta_p)$ where P is a collection of (correlated) personality traits and $\theta=U_{p\in P}\theta_p$.

In practice, however, a multi-task model does not provide significant improvements over a set of trait-specific models 50, and in some cases, may not perform as well.

Without intending to limit the scope of the exemplary embodiment, the following examples demonstrate the applicability of the method and a comparison with other methods.

Examples

As a dataset, the English data from the PAN 2015 Author Profiling task dataset, collected from Twitter and consisting of 14,166 tweets and 152 users was employed. See, Rangel, et al., "Overview of the 3rd Author Profiling Task at PAN 2015," Working Notes Papers of the CLEF 2015 Evaluation Labs, CEUR Workshop Proc., 2015, for a discussion of this dataset. For each user, there is a set of tweets (average n=100) and gold standard personality labels. For the five trait labels, scores between −0.5 and 0.5, are calculated following the author's self-assessment responses to the short Big 5 test, BFI-10 (see, Rammstedt, et al., "Measuring personality in one minute or less: A 10-item short version of the Big Five Inventory in English and German," J. Research in Personality, 41(1):203-212, 2007). This test is the most widely accepted and exploited scheme for personality recognition and has a solid grounding in language.

Each tweet is tokenized using the Twokenizer software, in order to preserve hashtag-preceded topics and user mentions. Each text is normalized by mapping these features to single characters (@username→@, http://t.co/→ˆ).

Experiments were performed at the user level and at the tweet level (individual short texts). In the experiments, the present feature-engineering-free approach, described above is compared with models which rely on linguistic features. In both settings, against models with or without feature engineering, the exemplary model achieves better results across all personality traits.

Due to the unavailability of a test corpus (withheld by the PAN 2015 organizers) the k-fold cross-validation performance (k=5 or 10) is compared on the available dataset. Performance is measured using Root Mean Square Error (RMSE) on either the tweet level or user level depending on the granularity of the task:

$$RMSE_{tweet} = \sqrt{\frac{\sum_{i=1}^{T}(y_{s_i} - \hat{y}_{s_i})^2}{T}} \text{ and } RMSE_{user} = \sqrt{\frac{\sum_{i=1}^{U}(y_{user_i} - \hat{y}_{user_i})^2}{U}}$$

where T and U are the total numbers of tweets and users in the corpus, $y_{s_i}$ and $\hat{y}_{s_i}$ the true and estimated personality trait score of the $i^{th}$ tweet, similarly $y_{user_i}$ and $\hat{y}_{user_i}$ are their user-level counterparts. Each tweet in the dataset inherits the same five trait scores as assigned to the author from whom they were drawn.

$$\hat{y}_{user_i} = \frac{1}{T_i}\sum_{j=1}^{T_i} y_{s_j},$$

where $T_i$ refers to the total number of tweets of $user_i$.

First, to evaluate the usefulness of multitask learning, the Pearson correlations of the dataset for the five personality traits Extroversion, Emotional Stability, Agreeableness, Conscientiousness and Openness (abbreviated as EXT, STA, AGR, CON and OPN respectively) were obtained and shown in Table 1.

TABLE 1

Pearson correlations for the five personality traits

| | EXT | STA | AGR | CON | OPN |
|---|---|---|---|---|---|
| EXT | | 0.295 *** | 0.257 ** | 0.216 ** | 0.057 |
| STA | 0.295 *** | | 0.351 *** | 0.091 | 0.045 |
| AGR | 0.257 ** | 0.351 *** | | 0.035 | 0.039 |
| CON | 0.216 ** | 0.091 | 0.035 | | 0.174 * |
| OPN | 0.057 | 0.045 | 0.039 | 0.174 * | |

Note:
* p ≤ 0.001,  p ≤ 0.01, * p ≤ 0.05

These results suggest that there are at least linear relationships between individual traits which could potentially be exploited by multitask learning.

1. Personality Trait Prediction at the User Level

Single-task and multitask models 50 were trained to predict the personality trait scores based purely on the character embeddings, with no additional features supplied. C2W2S4PT is trained with Adam (Kingma 2014) and hyperparameters: $E_c \in \mathbb{R}^{50 \times |C|}$, $\vec{h}_{i,j}^{c}$, and $\overleftarrow{h}_{i,j}^{c} \in \mathbb{R}^{256}$, $\vec{h}_i^{w}$ and $\overleftarrow{h}_i^{w} \in \mathbb{R}^{256}$, $W_{eh} \in \mathbb{R}^{512 \times 256}$, $b_h \in \mathbb{R}^{256}$, $W_{hy} \in \mathbb{R}^{256 \times 1}$, $b_y \in \mathbb{R}$, dropout rate to the embedding output: 0.5, batch size: 32. Training is performed until 100 epochs are reached. In addition to a single trait C2W2S4PT model for each of the five traits, multitask models were learned for pairs of traits (STA&AGR, AGR&CON) and for all five traits (C2W2S4PT—Multitask All).

To demonstrate the effectiveness of the model (C2W2S4PT), the performance at the user level was compared with other models incorporating linguistic and psychologically motivated features:

1. Sulea 2015: Sulea, et al., "Automatic profiling of twitter users based on their tweets," In Working Notes Papers of the CLEF 2015 Evaluation Labs, pp. 1-8, 2015. Sulea 2015 uses Character-Level n-grams.

2. Mirkin 2015: Mirkin, et al., "Motivating personality-aware machine translation," Proc. 2015 Conf. on Empirical Methods in Natural Language Processing, pp. 1102-1108, 2015. Mirkin 2015 uses, as features, 1-, 2-, 3-grams of surface, normalized and lemmatized forms; part-of-speech tagged forms, and n-grams of POS; named entities (places, persons, organization, dates, time expressions), emoticons, hashtags, mentions and URLs.

3. Nowson 2015: Nowson, et al., "XRCE personal language analytics engine for multilingual author profiling," Working Notes Papers of the CLEF, 2015. Nowson 2015 uses word-level features (unigram, bigram and trigram of surface and lemmatized form of the words; part-of-speech of surface and normalized word; words with negation, words with at least three repeated letters; bigram of repeated character, trigram of repeated character, and quadrigram of repeated characters); and class-based features (named entities (places, persons, organization, dates and time expressions); unigram, bigram and trigram of POS tags, positive emoticons, negative emoticons, other emoticons; hashtags, mentions and http links; use of feminine or masculine first-names and pronouns; and capitalized words)

To enable direct comparison with these three methods, the same dataset and evaluation metric $RMSE_{user}$ is used. The $RMSE_{user}$ results are shown in Table 2 (lower scores indicate better performance). For 5-fold cross-validation, a comparison was made with the tied-highest ranked model (under evaluation conditions) of the PAN 2015 submissions, described in Sulea 2015. For 10-fold cross-validation, the model of Nowson 2015, was used. As with the C2W2S4PT method reported here, these methods predicted scores on text level, and averaged for each user. The method of Mirkin 2015 reports results on concatenated tweets—a single document per user. The Average Baseline assigns the average of all the scores to each user.

TABLE 2

$RMSE_{user}$ across five traits

| k | Model | EXT | STA | AGR | CON | OPN |
|---|---|---|---|---|---|---|
| --- | Average Baseline | 0.166 | 0.223 | 0.158 | 0.151 | 0.146 |
| 5 | Sulea 2015 | 0.136 | 0.183 | 0.141 | 0.131 | 0.119 |
| | C2W2S4PT-single trait models | 0.131 | 0.171 | 0.140 | 0.124 | 0.109 |
| | C2W2S4PT-Multitask STA&AGR | x | 0.172 | 0.140 | x | x |
| | C2W2S4PT-Multitask AGR&CON | x | x | 0.138 | 0.124 | x |
| | C2W2S4PT- Multitask All | 0.136 | 0.177 | 0.141 | 0.128 | 0.117 |
| 10 | Mirkin 2015 | 0.171 | 0.223 | 0.173 | 0.144 | 0.146 |
| | Nowson 2015 | 0.153 | 0.197 | 0.154 | 0.144 | 0.132 |
| | C2W2S4PT-single trait models | 0.130 | 0.167 | 0.137 | 0.122 | 0.109 |
| | C2W2S4PT-Multitask STA&AGR | x | 0.168 | 0.140 | x | x |
| | C2W2S4PT-Multitask AGR&CON | x | x | 0.138 | 0.123 | x |
| | C2W2S4PT-Multitask All | 0.136 | 0.175 | 0.140 | 0.127 | 0.115 |

Bold highlights best performance. x indicates N/A.

The results show that the present RNN-based models outperform the methods of Sulea 2015, Mirkin 2015, and Nowson 2015. In the 5-fold cross-validation group, C2W2S4PT—Multitask All is superior to Average baseline and Sulea 2015, achieving better performance in three traits (tying the remaining traits). This is notable, considering the model is trained jointly on all five traits. Even greater improvement can be attained by training on fewer personality traits with C2W2S4PT. In terms of the performance measured by 10-fold cross-validation, the dominance of the RNN-based models is even more pronounced with C2W2S4PT outperforming the Mirkin 2015 and Nowson 2015 systems across all personality traits. C2W2S4PT achieves these improvements without use of any hand-crafted features.

2. Personality Trait Prediction at Single Tweet Level

Tweet-level performance was used to evaluate the models' capabilities to infer personality at a lower granularity level. For comparison, a number of baselines were created, where the only feature used is the surface form of the text. Two bag-of-word (BoW) systems, namely, Random Forest and Support Vector Machine (SVM) Regression, have been implemented for comparison. For these two BoW-based baseline systems, grid search is performed to find the best hyper-parameter configuration. For SVM Regression, the hyper-parameters include: kernel $\in$ {linear,rbf} and C$\in$ {0.01, 0.1, 1.0, 10.0} whereas for Random Forest, the number of trees is chosen from the set {10, 50, 100, 500, 1000}. The Average Baseline assigns the average of all the scores to each tweet.

Two simpler RNN-based baseline models, named Bi-GRU-Char and Bi-GRU-Word, which only work on character and word level, respectively, but share the same structure of the final MLP classifier ($h_s$ and $\hat{y}_s$), were created for comparison with the character to word compositional model C2W2S4PT. For training, C2W2S4PT used the same hyper-parameter configuration as described above for the user-level. For Bi-GRU-Char and Bi-GRU-Word, the character and word embedding size was set to 50 and 256 respectively. Hyper-parameter fine-tuning was not performed for the RNN-based models and C2W2S4PT. The $RMSE_{tweet}$ of each model, measured by 10-fold stratified cross-validation, is shown in Table 3.

TABLE 3

Tweet-level $RMSE_{tweet}$ across five traits

| Model | EXT | STA | AGR | CON | OPN |
|---|---|---|---|---|---|
| Average Baseline | 0.163 | 0.222 | 0.157 | 0.150 | 0.147 |
| SVM Regression | 0.148 | 0.196 | 0.148 | 0.140 | 0.131 |
| Random Forest | 0.144 | 0.192 | 0.146 | 0.138 | 0.132 |
| Bi-GRU-Char | 0.150 | 0.202 | 0.152 | 0.143 | 0.137 |
| Bi-GRU-Word | 0.147 | 0.200 | 0.146 | 0.138 | 0.130 |
| C2W2S4PT-Single task | 0.142 | 0.188 | 0.147 | 0.136 | 0.127 |
| C2W2S4PT-Multitask STA&AGR | x | 0.189 | 0.146 | x | x |
| C2W2S4PT-Multitask AGR&CON | x | x | 0.146 | 0.136 | x |
| C2W2S4PT-Multitask All | 0.142 | 0.191 | 0.146 | 0.137 | 0.127 |

The results indicate that C2W2S4PT achieves comparable or better performance than SVM Regression and Random Forest. This demonstrates that C2W2S4PT generates at least reasonably comparable performance with SVM Regression and Random Forest in the feature-engineering-free setting on the tweet level and it does so without exhaustive hyper-parameter fine-tuning. C2W2S4PT also performs well against the Bi-GRU-Char and Bi-GRU-Word RNN-based models. This success can be attributed to the model's capability of coping with arbitrary words while not forgetting information due to excessive lengths as can arise from representing a text as a sequence of characters. Also, given that C2W2S4PT does not need to maintain a large vocabulary embedding matrix as in Bi-GRU-Word, there are much fewer parameters for the model to learn, making it less prone to overfitting.

Multitask learning does not appear to provide significant benefits to performance. The model jointly trained on the weakest correlated pair (AGR&CON) achieves better results than the one trained on the strongest correlated pair (STA&AGR). Despite the noise introduced by training on non-correlated personality traits, there is little impact on the performance of the multitask-learning models and the model jointly trained on all 5 personality traits generates equally competitive performance.

Principal Component Analysis of Features

Figure 5:
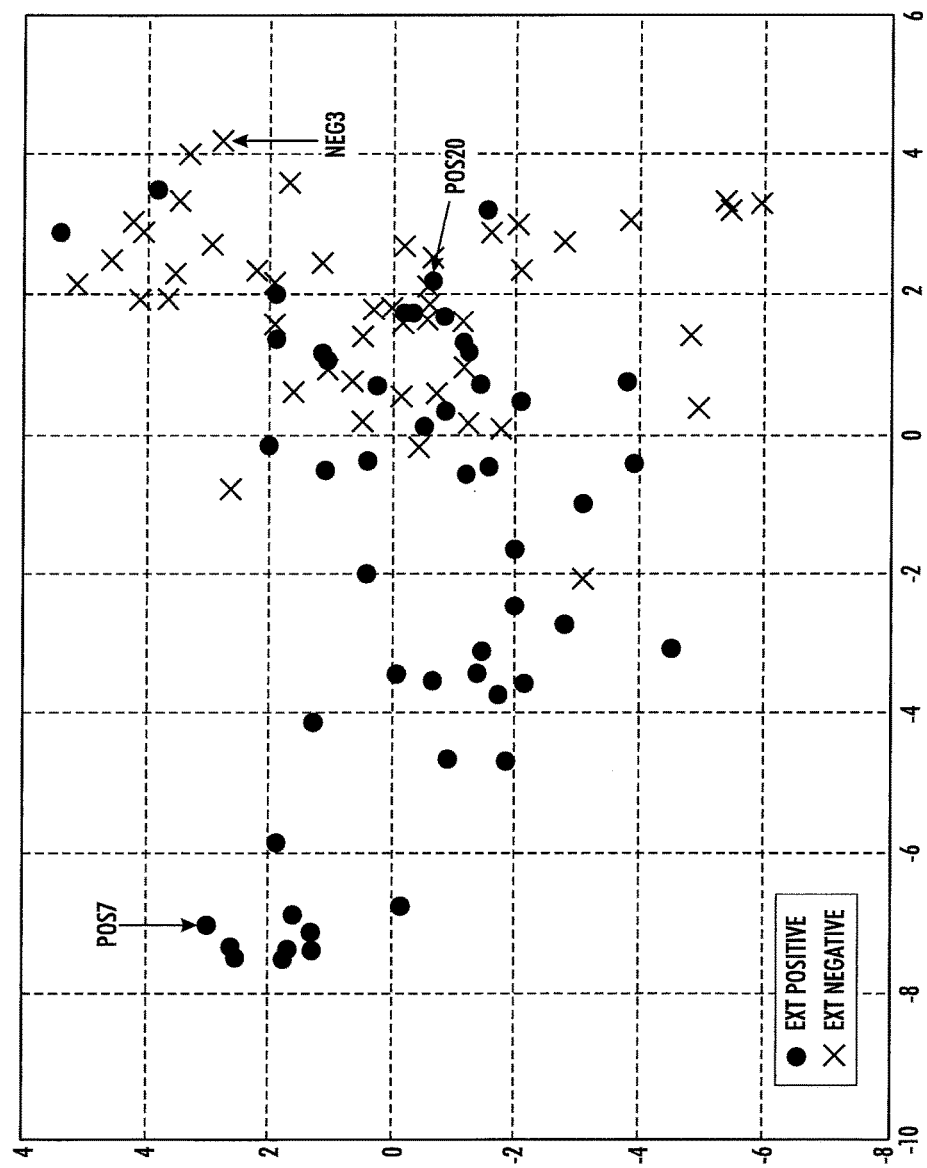
FIG. 5 is a scatter plot of sentence representations processed by PCA illustrating association between positive and negative trait examples.

To investigate the learned representations and features further, PCA was used to visualize the sentences evaluated with the C2W2S4PT model trained on a single personality trait. 100 tweets were randomly selected (50 tweets each from either end of the EXT spectrum) with their representations constructed by the model. FIG. 5 shows the scatter plot of the representations of the sentences reduced to a 2D space by PCA for the trait of Extraversion (EXT). This trait was selected as it is the most commonly studied and well understood trait. FIG. 5 shows clusters of both positive and negative Extraversion, though the former intersect the latter. Three examples are highlighted in the PCA plot.

POS7: "@ username: Feeling like you're not good enough is probably the worst thing to feel."

NEG3: "Being good ain't enough lately."

POS20: "o.O Lovely."

The first two examples (POS7 and NEG3) are drawn from largely distinct areas of the distribution. In essence the semantics of the short texts are the same. However, they both show linguistic attributes commonly understood to relate to Extraversion. POS7 is longer and, with the use of the second person pronoun, is more inclusive of others. NEG3, on the other hand, is shorter and self-focused, aspects indicative of Introversion. The third sentence, POS20, is a statement from an Extravert, which appears to map to an Introvert space. Indeed, while short, the use of "Eastern" style, non-rotated emoticons (such as o.O) has also been shown to relate to Introversion on social media (Schwartz 2013). One explanation might be that the model has uncovered a flexibility often associated with Ambiverts (Grant, "Rethinking the extraverted sales ideal: The ambivert advantage," Psychological Science 24(6), 24(6):1024-1030, 2013). In general, it appears that the model is capturing well-understood dimensions of language yet with no feature engineering.

One advantage of the present trait prediction model 50 is that lack of feature engineering may facilitate language independence. Preliminary tests on the Spanish data from the PAN 2015 Author Profiling dataset provide support for this.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for trait prediction comprising:
   receiving a text sequence comprising words, each of the words including at least one character, some of the words comprising more than one character;

generating a character embeddings for each of the characters of the text sequence, each character embedding being a multidimensional representation of a respective one of the characters;

generating word representations for words of the text sequence with a trained character sequence model, based on the character embeddings, each word embedding being a multidimensional representation of a respective one of the words of the text sequence, the character sequence model comprising a first recurrent neural network that receives the character embeddings for a word of the text sequence and outputs the word representation for the word;

generating a sequence representation for the text sequence with a trained word sequence model, based on the word representations;

generating at least one trait prediction with a trained trait model, based on the sequence representation; and outputting the trait prediction or information based on the trait prediction, wherein at least one of the generating character embeddings, generating word representations, generating the sequence representation, and generating at least one trait prediction is performed with a processor.

2. The method of claim 1, wherein each character embedding, word representation, and sequence representation is a multidimensional representation of at least ten dimensions.

3. The method of claim 1, wherein the first recurrent neural network comprises a bi-directional RNN which generates a hidden state for each character of the word in forward and backward directions.

4. The method of claim 1, wherein the word sequence model comprises a second recurrent neural network that receives the word embeddings and outputs the sequence representation.

5. The method of claim 4, wherein the second recurrent neural network comprises a bi-directional RNN which generates a hidden state for each word of the text sequence in forward and backward directions.

6. The method of claim 1, wherein the generating of the at least one trait prediction comprises generating a score for each of a plurality of predefined traits.

7. The method of claim 1, wherein the trait model comprises at least one neural network.

8. The method of claim 7, wherein the trait model comprises a neural network for each of a plurality of predefined traits, each of the neural networks being used to predict a respective score for a respective one of the plurality of predefined traits, based on the sequence representation.

9. The method of claim 1, wherein the character sequence model, word sequence model, and trait model have been trained on a collection of text sequences, each labeled with a respective value for at least one predefined trait.

10. The method of claim 1, further comprising jointly training the character sequence model, word sequence model, and trait model on a collection of text sequences, each labeled with a respective value for at least one predefined trait.

11. The method of claim 10, wherein the training comprises, for each of a plurality of predefined traits, jointly training a respective character sequence model, word sequence model, and trait model for a respective one of the plurality of predefined traits.

12. The method of claim 1, wherein the generating of the at least one trait prediction comprises generating a trait prediction for an author of a group of text sequences, based on respective sequence representations of the text sequences.

13. The method of claim 1 wherein the text sequence comprises a tweet.

14. The method of claim 13, further comprising preprocessing the text sequence, comprising mapping features to single characters, the features being selected from hashtag-preceded topics, user mentions, and uniform resource locators.

15. A computer program product comprising a non-transitory recording medium storing instructions, which when executed on a computer, causes the computer to perform the method of claim 1.

16. A system for trait prediction comprising:
a hierarchical prediction model comprising:
   a character sequence model, which generates word representations for words of an input text sequence, the text sequence including a sequence of words, each word including a sequence of characters, at least some of the words including more than one character, each word representation being based on the respective character embeddings of each of the characters in the word, the character sequence model comprising a first recurrent neural network that receives the character embeddings for a word of the input text sequence and outputs the word representation for the word;
   a word sequence model, which generates a sequence representation for the text sequence, based on the word representations, the word sequence model comprising a second recurrent neural network that receives the word embeddings and outputs the sequence representation; and
   a trait model, which generates at least one trait prediction, based on the sequence representation;
a character embedding component, which generates character embeddings for characters of an input text sequence, each character embedding being a multidimensional representation;
a modeling component, which inputs the character embeddings for each word into the hierarchical prediction model; and
a processor which implements the character embedding component and modeling component.

17. The system of claim 16, further comprising:
a learning component which learns parameters of the hierarchical prediction model on a collection of text sequences, each text sequence being labeled with a respective value for at least one predefined trait.

18. A method for representing text sequences and outputting information regarding an author of the text sequences, the method comprising:
receiving a group of text sequences, each text sequence comprising a sequence of words, each of the words comprising a sequence of at least one character, at least some of the words comprising more than one character;
for each text sequence:
   with a character embedding component, generating a character embedding for each of the characters of the input text sequence, each character embedding being a multidimensional representation of at least ten dimensions and being a product of a one hot vector and a learned parameter matrix;
   inputting the character embeddings into a trained hierarchical prediction model comprising:

a trained character sequence model, which generates word representations for words of the text sequence, based on respective character embeddings, each word representation being a multidimensional representation of at least ten dimensions, the character sequence model comprising a first recurrent neural network that receives the character embeddings for a word of the text sequence and outputs the word representation for the word; and a trained word sequence model, which generates a sequence representation for the text sequence, based on the word representations, each sequence representation being a multidimensional representation of at least ten dimensions, the word sequence model comprising a second recurrent neural network that receives the word representations and outputs the sequence representation; and generating at least one trait prediction with a trained trait model, based on the output sequence representation; and outputting information regarding an author of the text sequences, based on the at least one trait prediction;

wherein at least one of the generating character embeddings and inputting the character embeddings into a hierarchical prediction model is performed with a processor.

* * * * *